(12) United States Patent  
Walker et al.

(10) Patent No.: US 8,185,471 B1
(45) Date of Patent: May 22, 2012

(54) INTEGRATED PAYMENT RECEIVING AND PROCESSING SYSTEM

(75) Inventors: Robert Bradley Walker, Waxhaw, NC (US); Ellen Anne O'Hare, Darien, TX (US)

(73) Assignee: Bank of America Corporation, Charlotte, NC (US)

( * ) Notice: Subject to any disclaimer, the term of this patent is extended or adjusted under 35 U.S.C. 154(b) by 846 days.

(21) Appl. No.: 12/235,918

(22) Filed: Sep. 23, 2008

(51) Int. Cl.
G06Q 40/00 (2006.01)

(52) U.S. Cl. ............................. 705/40; 705/45
(58) Field of Classification Search .............. 705/40, 705/45
See application file for complete search history.

(56) References Cited

U.S. PATENT DOCUMENTS

| | | | | |
|---|---|---|---|---|
| 5,310,062 | A | * | 5/1994 | Stevens et al. ............... 209/584 |
| 5,441,159 | A | * | 8/1995 | DeWitt et al. ............... 209/584 |
| 5,518,121 | A | * | 5/1996 | Stevens et al. ............... 209/1 |
| 5,842,577 | A | | 12/1998 | Stevens et al. |
| 5,926,392 | A | | 7/1999 | York et al. |
| 6,311,846 | B1 | * | 11/2001 | Hayduchok et al. ........ 209/3.3 |
| 2002/0104782 | A1 | | 8/2002 | DeWitt et al. |
| 2007/0045930 | A1 | | 3/2007 | Hayduchok et al. |

* cited by examiner

Primary Examiner — Lindsay M. Maguire
(74) Attorney, Agent, or Firm — Esther F. Queen; Moore & Van Allen, PLLC (57) ABSTRACT

Systems, methods, and computer program products are provided for integrating a mail receiving process with a payment processing system. Embodiments of the invention include a capture device configured to: (1) receive a plurality of payment-related mail items comprising a plurality of envelopes containing one or more items; (2) scan the plurality of envelopes and the items to obtain data about each of the plurality of payment-related mail items; (3) identify one or more exception situations regarding one or more payment-related mail items; (4) associate an exception indicator with the data obtained about the one or more payment-related mail items, wherein the exception indicator provides an indication as to an exception type selected from a plurality of exception types; and (5) communicate the data and the one or more exception indicators to a payment processing system. The payment processing system is configured to recognize the exception indicators and process the associated data based on the exception indicators.

33 Claims, 7 Drawing Sheets

INTEGRATED PAYMENT RECEIVING AND PROCESSING SYSTEM

FIELD

In general, embodiments of the invention relate to systems, methods, and computer program products for automating the receipt and processing of payments through the mail.

BACKGROUND

Despite the existence of many electronic bill payment systems, many banks, credit card companies, utilities, businesses, and other institutions that bill customers still receive a substantial amount of payments in the mail. Opening, sorting, and processing all of this mail can be costly and time consuming. Furthermore, paper-based communication also allows for a significant amount of exception situations that further complicate the payment receiving process. For example, some customers may send a check alone, other customers may send the invoice with the check, and still others may send a check with some other piece of paper containing instructions or other communications for the institution. An automated system for processing paper-based payments and appropriately handling exception situations would be desirable.

SUMMARY

In general, embodiments of the present invention include systems, methods, and computer program products for integrating a mail receiving process with a payment processing system. For example, embodiments of the invention include a system for processing bill payments received by mail, where the system includes a capture device configured to: (1) receive a plurality of payment-related mail items comprising a plurality of envelopes containing one or more items; (2) scan the plurality of envelopes and the items to obtain data about each of the plurality of payment-related mail items; (3) identify one or more exception situations regarding one or more payment-related mail items; (4) associate an exception indicator with the data obtained about the one or more payment-related mail items, wherein the exception indicator provides an indication as to an exception type selected from a plurality of exception types; and (5) communicate the data and the one or more exception indicators to a payment processing system. The payment processing system is configured to recognize the exception indicators and process the associated data based on the exception indicators. For example, in one embodiment, the payment processing system is configured to direct the data about the one or more payment-related mail items to one or more exception process paths based on the one or more exception indicators associated with the data. In some embodiments, the payment processing system is configured to bill a customer a predefined amount based on the one or more exception indicators associated with the data.

In one embodiment, the system further includes the payment processing system, where the payment processing system is configured to process bill payments based on the data received about one of the plurality of payment-related mail items according to one of a plurality of predefined procedures, wherein the one of the plurality of predefined procedures is selected based on whether the one of the plurality of payment-related mail items is associated with an exception indicator and, if the one of the plurality of payment-related mail items is associated with an exception indicator, the exception type.

In some embodiments, the capture device is configured to identify a particular delivery method that was used to deliver the mail to the system, such as a walk-in delivery, an express mail deliver, or a standard postal system delivery. In such embodiments, an exception indicator may provide an indication of the particular delivery method. In some embodiments, the capture device is configured to determine that the legal amount on a check does not match the courtesy amount on the check. In such embodiments, an exception indicator may provide an indication to the processing system that the legal amount on the check does not match the courtesy amount on the check. In some embodiments, the capture device is configured to determine that a form of payment includes a foreign payment amount. In such embodiments, an exception indicator may provide an indication to the processing system that the form of payment includes a foreign payment amount. In some embodiments, the capture device is configured to determine that one or more items contain correspondence. In such embodiments, an exception indicator may provide an indication to the processing system that the one or more items contain correspondence.

Embodiments of the present invention further provide a method performed by a first device, the method comprising: (1) receiving a payment-related mail item comprising an envelope containing one or more documents; (2) capturing data from the envelope or the one or more documents; (3) receiving an indication of an exception situation regarding the payment-related mail item; (4) associating an exception indicator with the data obtained from the envelope or the one or more documents, wherein the exception indicator provides an indication as to an exception type selected from a plurality of exception types; and (5) communicating the data along with the exception indicator to a second device configured to process a payment based on the data and the exception indicator. In some embodiments, the second device is configured to direct the data to an exception process path based on the exception indicator associated with the data. In some embodiments, the second device is configured to bill a customer a predefined amount based on the exception indicator associated with the data.

In some embodiments, capturing data from the envelope or the one or more documents includes scanning one or more machine-readable codes associated with the envelope or the one or more documents. In some embodiments, receiving an indication of an exception situation regarding the payment-related mail item includes automatically identifying the exception situation based on the captured data. In some embodiments, receiving an indication of an exception situation regarding the payment-related mail item includes receiving input from a user terminal containing an indication of an exception situation.

In one embodiment of the method, the exception situation comprises an express mail delivery, a walk-in delivery, a correspondence document, a foreign payment instrument, or a situation where the legal amount on a check does not match a courtesy amount on the check.

Embodiments of the present invention also provide a computer program product comprising a computer-readable medium having computer-executable program instructions stored therein, where the computer-executable program instructions include: (1) first instructions for identifying a payment-related mail item comprising an envelope containing one or more documents; (2) second instructions for capturing data from the envelope or the one or more documents; (3) third instructions for receiving an indication of an exception situation regarding the payment-related mail item; (4) fourth instructions for associating an exception indicator with the data obtained from the envelope or the one or more documents, wherein the exception indicator provides an indication as to an exception type selected from a plurality of exception types; and (5) fifth instructions for communicating the data along with the exception indicator to a second device configured to process a payment based on the data and the exception indicator.

In some embodiments of the computer program product of claim, the second instructions for capturing data from the envelope or the one or more documents include instructions for interpreting one or more machine-readable codes associated with the envelope or the one or more documents. In some embodiments, the third instructions for receiving an indication of an exception situation regarding the payment-related mail item include instructions for automatically identifying the exception situation based on the captured data. In some embodiments, the third instructions for receiving an indication of an exception situation regarding the payment-related mail item include instructions for receiving input from a user terminal containing an indication of an exception situation.

BRIEF DESCRIPTION OF THE DRAWINGS

Having thus described embodiments of the invention in general terms, reference will now be made to the accompanying drawings, which are not necessarily drawn to scale, and wherein:

DETAILED DESCRIPTION OF EMBODIMENTS OF THE INVENTION

Embodiments of the present invention now will be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

As will be appreciated by one of skill in the art, the present invention may be embodied as a method (including a business process), system, computer program product, or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product on a computer-readable medium having computer-usable program code embodied in the medium.

Any suitable computer-readable medium may be utilized. The computer-readable medium may be, for example but not limited to, an electronic, magnetic, optical, electromagnetic, infrared, or semiconductor system, apparatus, device, or propagation medium. More specific examples of the computer-readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device; or transmission media such as those supporting the Internet or an intranet. Note that the computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

In the context of this document, a computer-readable medium may be any medium that can contain, store, communicate, propagate, or transport the program for use by or in connection with the instruction execution system, apparatus, or device. The computer-readable medium may include a propagated data signal with the computer-usable program code embodied therewith, either in baseband or as part of a carrier wave. The computer-usable program code may be transmitted using any appropriate medium, including but not limited to the Internet, wireline, optical fiber cable, radio frequency (RF) signals, or other mediums.

Computer program code for carrying out operations of embodiments of the present invention may be written in an object-oriented, scripted or unscripted programming language such as Java, Perl, Smalltalk, C++, or the like. However, the computer program code for carrying out operations of embodiments of the present invention may also be written in conventional procedural programming languages, such as the "C" programming language or similar programming languages.

Embodiments of the present invention are described below with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block(s).

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

Figure 1:
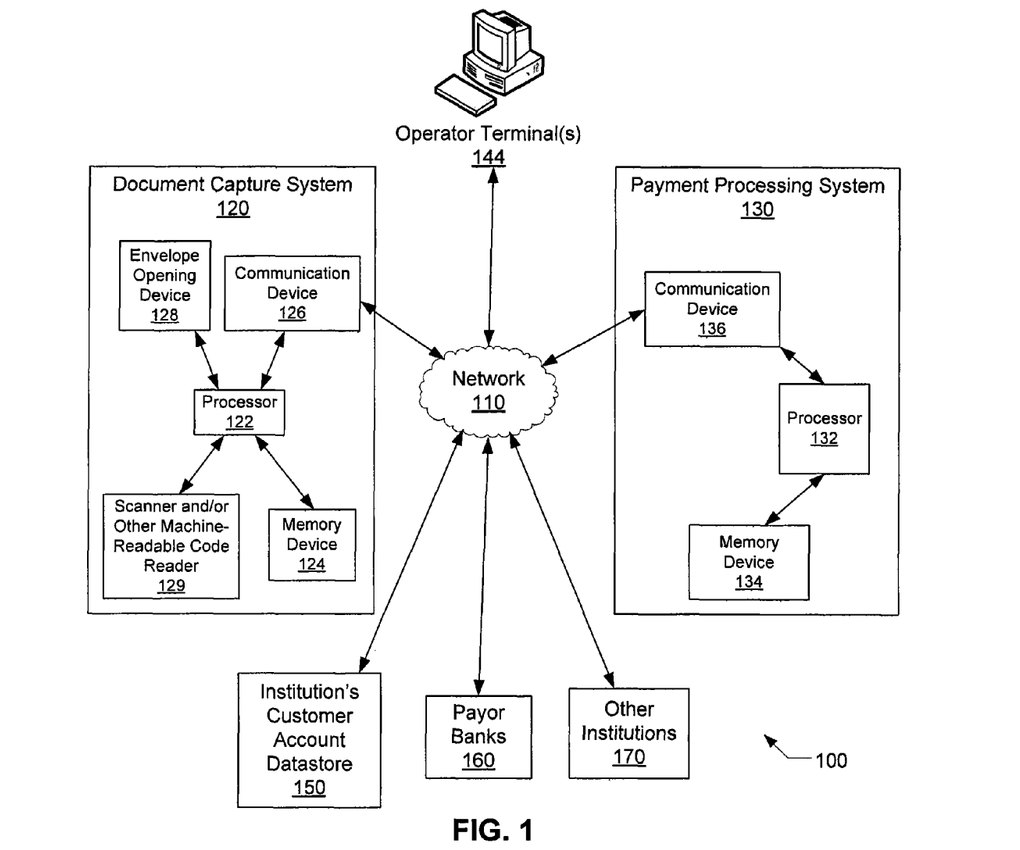
FIG. 1 is a block diagram illustrating a paper-based payment receiving and processing system, in accordance with one embodiment of the present invention.

FIG. 1 illustrates a payment receiving and processing system 100 in accordance with an embodiment of the present invention. The system 100 includes a document capture system 120 for receiving, scanning, identifying, and capturing data from paper-based payment documents. The system 100 also includes a payment processing system 130. The payment processing system 130 is configured to receive information from the document capture system 120 about the received payment documents, and then process the payments based on the information received from the document capture system 120. In this regard, the document capture system 120 and the payment processing system 130 are communicably coupled to one another via network 110.

In one embodiment, the network 110 includes a direct wireless or wireline connection between the document capture system 120 and the payment processing system 130. In other embodiments, however, the network 110 includes one or more other devices that relay communications between the two systems. The network 110 may include a global area network (GAN), such as the Internet, a wide area network (WAN), a local area network (LAN), a wireless network, a wireline network, a virtual private network, and/or the like.

As illustrated in FIG. 1, the document capture system 120 generally includes a processor 122 operatively coupled to a communication device 126, an envelope opening device 128, a scanner and/or other machine-readable code reader 129, and a memory device 124. The processor 122 is configured to use the communication device 126 to communicate with other devices on the network 110, such as the payment processing system 130 and an operator terminal 144. In this regard, the communication device 126 generally comprises a network interface. The network interface may include a modem, server, or other electronic device that communicatively couples the document capture system 120 to another electronic device or a network 110 of devices.

The processor 122 is also configured to use an envelope opening device 128 for opening envelopes received through the mail or other delivery systems. The processor 122 is further configured to operate one or more scanners and/or other machine-readable code readers 129, such as barcode readers, RFID tag readers, image scanners, optical character recognition devices, and/or the like. With these devices, the processor 122 captures information from the envelopes and documents received from the mail. In one embodiment, the envelope opening device, scanner, machine-readable code readers, and/or other aspects of the document capture system 120 include mail processing devices provided by OPEX® Corporation of Moorestown, N.J.

The processor 122 is configured to use the different devices described above to perform certain functions described herein by executing computer-usable program instructions stored on the memory device 124 and/or received from other devices on the network 110. In this regard, the memory device 124 includes one or more types of computer-readable medium for storing computer-usable program instructions and other data therein. In addition to storing computer-usable program instructions, the memory device 124 also stores data gathered from the documents captured by the document capture system 120, as described in greater detail below.

Like the document capture device 120, the payment processing system 130 also includes a processor 132 operatively coupled to a communication device 136 and a memory device 134. The processor 132 is configured to use the communication device 136 to communicate with other devices on the network 110, such as the document capture system 120, an operator terminal 144, a customer account datastore 150, one or more payor banks 160, and/or other institutions 170 involved in the payment process. In this regard, the communication device 136 generally comprises a network interface. The network interface may include a modem, server, or other electronic device that communicatively couples the payment processing system 130 to another electronic device or a network 110 of devices.

The processor 132 is generally configured to receive information, including payment information, from the document capture system 120. The processor 132 then uses this information to process payments. In this regard, the processor 132 is configured to perform certain functions described herein by executing computer-usable program instructions stored on the computer-readable medium making up the memory device 134 or received from other network devices.

As illustrated in FIG. 1, the system 100 also includes one or more operator terminals 144 communicably coupled to the network 110. The operator terminal 144 allows communication between one or more operators and the document capture system 120 and/or the payment processing system 130. The operator terminal 144 may include a personal computer, laptop, mobile terminal, or other computing device separate from the devices of the document capture system 120 and the payment processing system 130. In other embodiments, however, the operator terminal 144 or portions thereof are integrated with the communication devices of the document capture system 120 and/or the payment processing system 130. To facilitate communication between the operator terminal 144 and the document capture system 120 and/or the payment processing system 130, the operator terminal 144 generally includes a user interface comprising one or more user output devices, such as a display and a speaker or other audio device (e.g., a ringer, buzzer, or bell), and one or more user input devices, such as one or more keys or dials, a touch pad, touch screen, keyboard, mouse, microphone; and/or the like.

Figure 2:
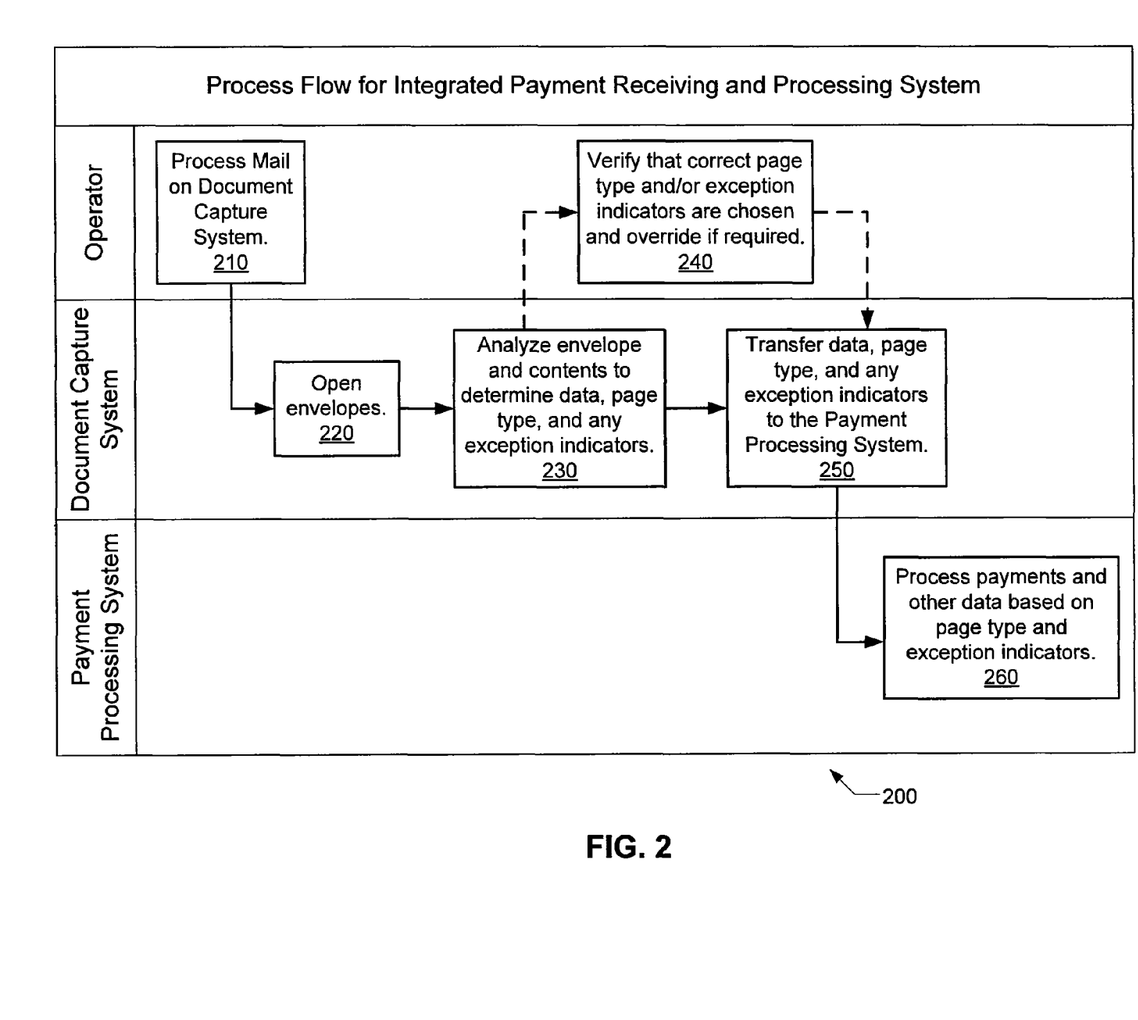
FIG. 2 is a flow diagram illustrating the general process flow of an integrated payment receiving and processing system, in accordance with an embodiment of the present invention.

FIG. 2 provides a flow diagram illustrating the general process flow 200 of an integrated payment receiving and processing system, in accordance with an embodiment of the present invention. As represented by block 210, the operator generally oversees the receipt and processing of incoming mail by the document capture system 120. Mail is received from one or more delivery systems. For example, in most instances, mail is received through the U.S. Postal Service or other postal system. In some instances, however, mail may be delivered by hand, by the customer making a payment or by some other individual.

In general, the P.O. Box number or other address information on the mail will cause the mail to be directed to a particular lockbox. In one embodiment, the payment receiving and processing system 100 is configured such that it can be used to process payments received in several different lockboxes. In such an embodiment, the operator selects the mail from a particular lockbox and feeds it into the document capture system 120. The mail for a particular lockbox may be processed in batches. For example, a batch may be all of the mail received in the lockbox on a particular day or within some other period of time.

In general, the mail arrives in an envelope. As represented by block 220, the document capture system 120 uses an envelope opening device to open the envelopes and remove the contents of the envelope. In general, the envelope's contents include one or more remittance documents, such as a payment stub or coupon. The envelope's contents also typically include one or more forms of payment, such as a check, money order, other negotiable instrument, cash, and/or other forms of payment.

As represented by block 230, the document capture system 120 uses its scanner(s) and/or other machine-readable code reader(s) to capture and analyze the envelope and its contents. More particularly, the document capture system 120 captures data from the envelope and its contents to be used by the capture system 120 to identify the type of each document/mailing and/or to be used by the payment processing system 130 to process payments or other information received from the customer. For example, if there is a barcode on an envelope or other document, the barcode may be scanned by a barcode reader and the data stored in the memory device 124. If the document is a check, an image of the check may be recorded and stored in the memory device 124 and then a character recognition program may be used to identify specific items of information on the check. The document capture system 120 then uses at least some of the data captured from the documents to assign a page type to each document. The document capture system 120 may also assign one or more exception indicators to each document or mailing if the document capture system 120 or the operator identifies one or more predefined exception situations with regard to that particular document or mailing.

As represented by block 240, in some instances, the operator reviews operations of the document capture system 120 during the process and verifies the correct page types and exception indicators are identified and assigned by the system 120. If the operator sees a page type or exception that was not identified or was identified incorrectly, the operator can use the operator terminal 144 to override the document capture system 120.

As represented by block 250, after the desired data is captured from the documents and after page types and/or exception indicators are assigned to each document/mailing, the document capture system 120 uses its network interface to transfer the data, page type, and any exception indicators to the payment processing system 130 via network 110. In one embodiment, this data is then stored in the memory device 134 of the payment processing system 130.

As represented by block 260, the payment processing system 130 then uses the received data and processes the payments and/or other information received in each mailing based on the page types and any exception indicators. Eventually, the payment processing system 130 communicates with the payor banks 160 and/or other institutions involved in the payment process to request payment for any negotiable instruments received and communicates with the institution's customer account datastore 150 to update information about the accounts for which mail was received.

FIGS. 3a-3e provide a flow diagram illustrating a more detailed integrated payment receiving and processing method, in accordance with one embodiment of the present invention. It should be appreciated that FIGS. 3a-3e illustrate only one embodiment of the invention and that, in other embodiments of the invention, additional or fewer functions and steps may be present and the functions and steps described herein may occur in different orders.

Figure 3A:
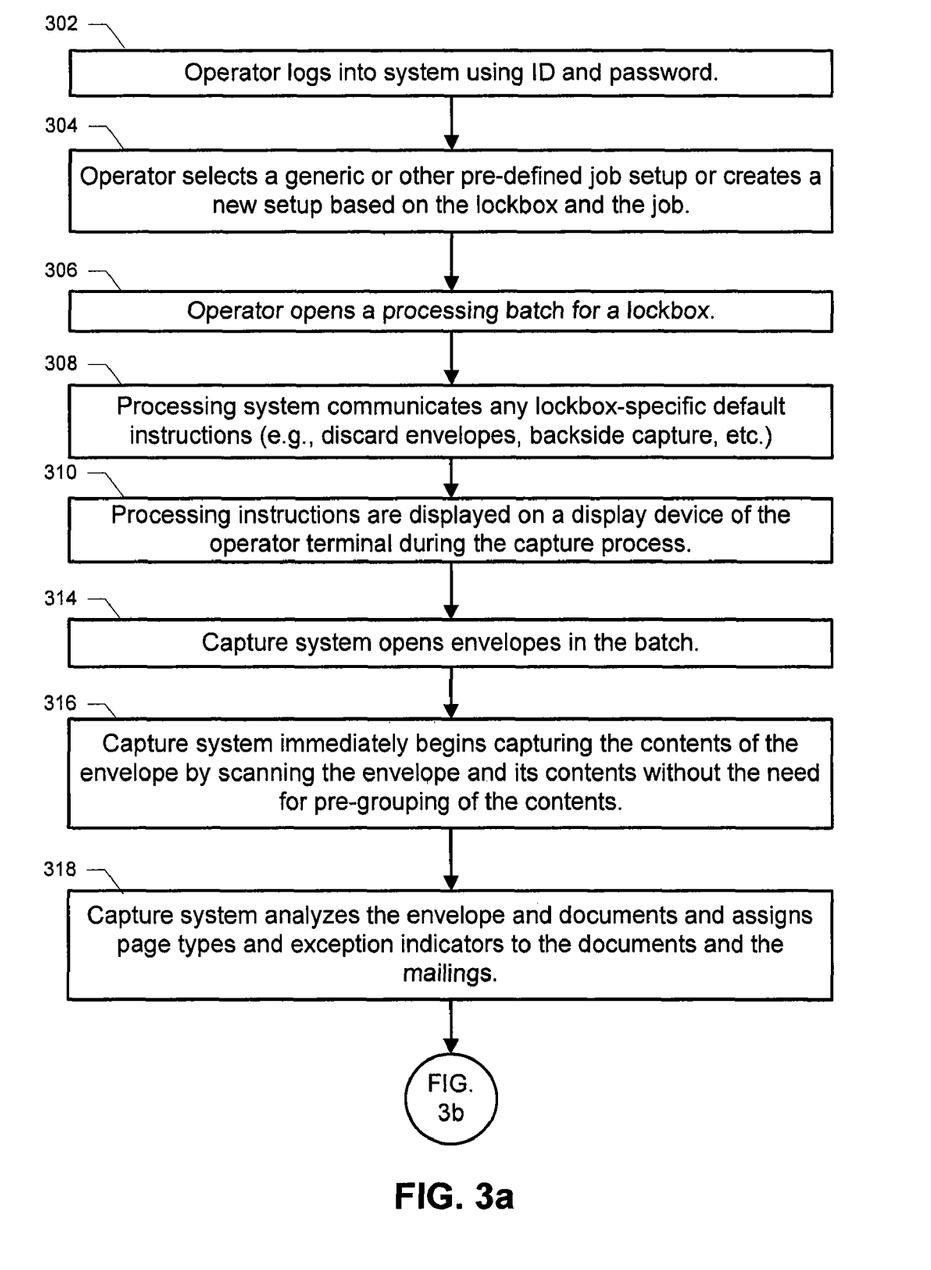
FIGS. 3a-3e provide a flow diagram illustrating a more detailed integrated payment receiving and processing method, in accordance with one embodiment of the present invention.

Referring now to FIG. 3a, block 302 illustrates that the operator logs into the document capture system 120 from the operator terminal 144 using his/her standard employee ID and password. In this regard, the document capture system 120 has the ability to access a current file of standard employee IDs and passwords, and uses that file during the capture system log-in process. In one embodiment, the payment processing system 130 has an up-to-date, encrypted, operator ID and password datastore on its memory device 134 and/or has access to such a datastore on another of the institution's memory devices. In such an embodiment, the payment processing system 130 makes the current operator ID and password datastore available to the document capture system 120 on a daily basis. In one embodiment, the operator ID and password datastore is updated during a "Start of Day" process at the beginning of each day's operations. In some embodiments, the ability exists on the capture system for the operator to change his/her password intra-day.

In addition to being used for log-in functions, the operator's ID is generally included by the document capture system 120 along with the document files transmitted to the payment processing system 130. This allows for the tracking of certain operator performance metrics.

As represented by block 304, the operator creates or selects a set-up for capturing and processing mail from a particular lockbox. In some instances, the operator selects a generic set-up or some other predefined set-up from a plurality of predefined set-ups, such as several lockbox-specific set-ups, stored in the memory of the document capture system 120 and/or the payment processing system 130. In other instances, the operator creates a new set-up or modifies a generic set-up. Use of such generic set-ups reduces the amount of manual processing required to set up a lockbox.

As represented by block 306, the operator then opens a payment processing batch for a lockbox by, for example, entering a lockbox number on a keypad or keyboard of the operator terminal 144. The document capture system 120 is able to recognize a closed lockbox when accessed by an operator, and notifies the operator accordingly if the selected lockbox is closed. It is common for a lockbox to be closed as the company determines that its service needs have changed. This could be due to the company transitioning to a new institution or due to a product change at the company.

As represented by block 308, once a lockbox is selected, the processing system 130 communicates any lockbox-specific instructions to the document capture system 120. For example, such instructions may include, but are not limited to, "discard envelopes" and "back side capture of all envelope contents," etc.

In some embodiments, as represented by block 310, the operator has the ability to view current processing instructions during the document capture process. Current instructions include envelope processing instructions, document scanning instructions, recent changes or special instructions, special alerts and negotiability instructions, etc. In one embodiment, the operator terminal has a second screen that is used to display the processing instructions during the document capture process.

As represented by block 314, the capture system opens envelopes in the batch and removes the contents of the envelope, which may include a check or other form of payment, a payment stub, a correspondence document, multiple payments and payment stubs, and/or other documents. As represented by block 316, the document capture system 120 immediately begins capturing the contents of the envelope by scanning the envelope and its contents. For example, in one embodiment, the document capture system 120 is configured to scan and record images of the front and/or back sides of the envelope and each of its contents and store this data in its memory 124. The document capture system 120 is also generally configured to recognize machine-readable code on some or all of the envelopes and documents and scan these machine-readable codes and store the data gathered therefrom in the memory 124. For example, the document capture system 120 may be configured to locate and scan a barcode on the payment stub or an RFID tag on the envelope. In one embodiment, the document capture system 120 uses optical character recognition tools to determine other data from the envelope and/or the other documents, such as the legal and courtesy amounts on a check or other negotiable instrument.

In one embodiment, the document capture system 120 performs these document capture steps without the need to pre-process or pre-group the contents. In this regard, in one embodiment, the payment processing system 130 has the ability to automatically "group" transactions according to the company's processing instructions by analyzing the document content captured by the document capture system 120. For example, in one embodiment, the payment processing system 13Q groups transactions into such groups as "multi" transactions, check-only transactions, and scannable transactions. Groups are most commonly dictated by the company and are usually driven by the company's specific internal process that requires an exception to the normal payment process. Grouping items allows items identified to a group to be highlighted or separated into a different section of the accounts receivable information transmitted to the company. Grouping also allows the processing system to apply different processing rules to specified items that would not normally be allowed if items were not separated into a group. Although the exemplary categories mentioned above include "multi" transactions, check-only transactions, and scannable transactions, other highly-specialized grouping may exist at the request of the company. During the capture process, the operator has the ability to automatically designate a group identifier to a specific transaction during the document capture process, as an exception process. The payment processing system 130 is then configured to recognize the group identifier and process the transaction accordingly. In one embodiment, the document capture system 120 uses the scanned envelope as an end-of-transaction identifier for scannable transactions, and then substitutes an electronic end-of-transaction indicator to the processing system 130.

As represented by block 318, as the document capture system 120 scans the envelopes and documents and captures data therefrom, the document capture system 120 analyzes this data and determines the types of documents and assigns page types to each document. The document capture system 120 is also configured to recognize several predefined exception situations for certain documents and/or transactions, and assigns certain exception indicators to the document and/or transaction to notify the payment processing system 130 of these exceptions. In one embodiment, the operator can override the document capture system 120 to insert and/or remove exception indicators that are improperly missed or assigned by the document capture system 120 during the capture process.

Figure 3B:
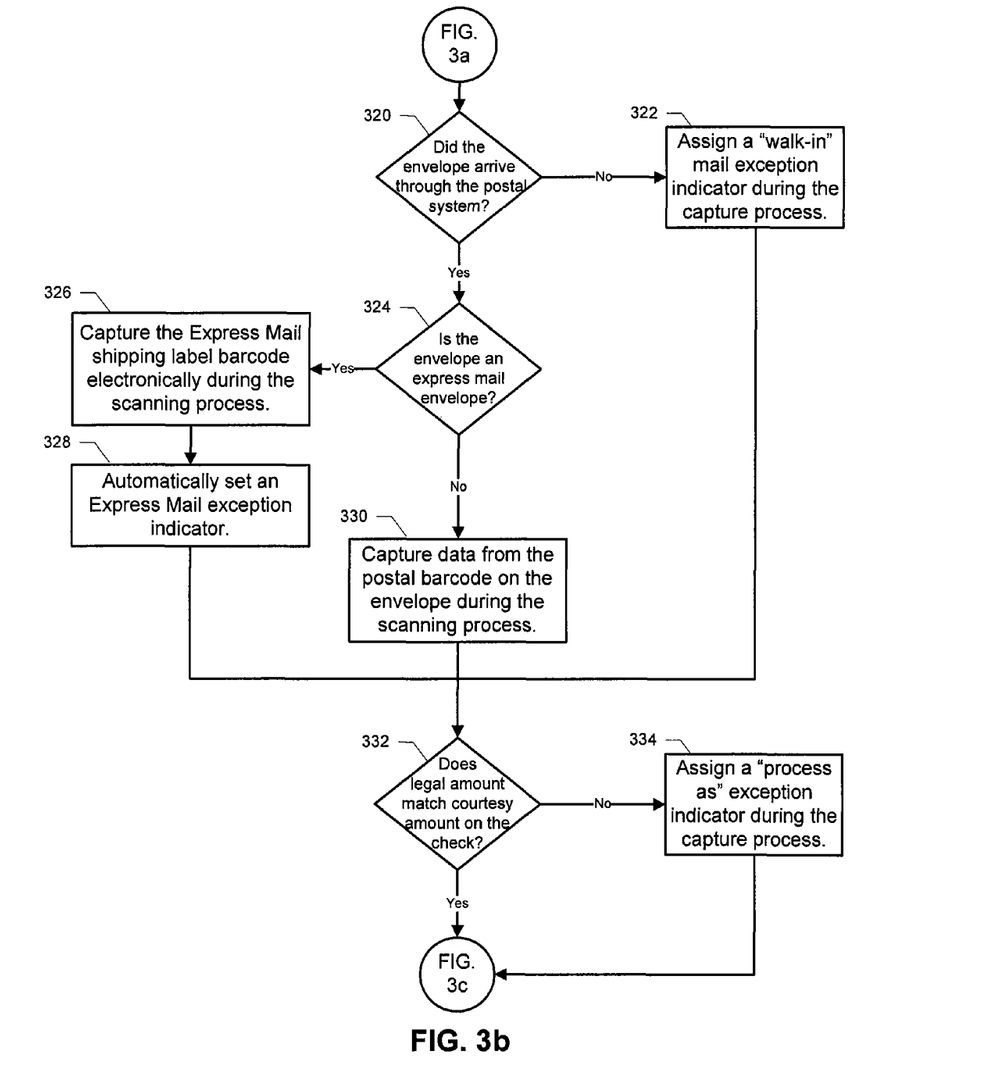

For example, FIG. 3b illustrates several exception situations. As represented by block 320, the document capture system 120 determines whether the envelope or other payment document arrived through a postal system or was "walked in" by a customer or other person. In some instances, the document capture system 120 determines this automatically by identifying a postal stamp, barcode, or other postal system identifier. In other instances, the document capture system 120 receives input from the operator terminal 144 indicating that a particular envelope being processed was hand-delivered. As represented by block 322, where the document capture system 120 determines that the envelope did not arrive through the postal system, the document capture system 120 assigns a "walk-in mail" exception indicator to the transaction as, for example, metadata associated with the other data captured from the envelope and its contents.

As represented by block 324, if the mail is determined to have arrived through the postal system, the document capture system 120 then determines whether the envelope is an Express Mail envelope or otherwise arrived through an Express Mail system. Whether a payment is mailed using the Express Mail system is important in some embodiments of the present invention where the company offers certain priority processing procedures when Express Mail is used, and charges an additional fee for these priority procedures. In some instances, the document capture system 120 determines this automatically by identifying an Express Mail shipping label, machine-readable code, or other Express Mail identifier. In other instances, the document capture system 120 receives input from the operator terminal 144 indicating that a particular envelope was delivered through the Express Mail system. As represented by block 326, where the document capture system 120 determines that the envelope did arrive through the Express Mail system, the document capture system 120 automatically scans the barcode and/or captures other machine-readable data on the Express Mail shipping label. This data is saved in the memory device 124 and, as described below, later transferred to the payment processing system 130 along with other data about the envelope, its contents, and the transaction in general. As represented by block 328, the document capture system 120 also assigns an "Express Mail" exception indicator to the transaction as, for example, metadata associated with the other data captured from the envelope and its contents.

As represented by block 330, if the envelope is not an Express Mail envelope and/or did not arrive through the Express Mail system, the document capture system 120 automatically captures data from the postal barcode on the envelope and/or other machine-readable data from the envelope. This data is saved in the memory device 124 and, as described below, later transferred to the payment processing system 130 with other data about the envelope, its contents, and the transaction in general.

As represented by block 332, the document capture system 120 also scans the check or other negotiable instrument to determine any common issues. For example, in the illustrated embodiment of the invention, the document capture system 120 uses optical character recognition hardware and software to determine the "legal amount" written on the check (i.e., the amount written-out on the line) and the "courtesy amount" written on the check (i.e., the numerical representation of the amount written in the box). This data is stored in the memory 124 with the other related transaction data, and the document capture system 120 compares these amounts to determine if they are the same, as represented by block 332. If the document capture system 120 determines that the legal amount does not match the courtesy amount on a check, the document capture system 120 assigns a "process as" exception indicator to the transaction involving the check, as represented by block 334.

Figure 3C:
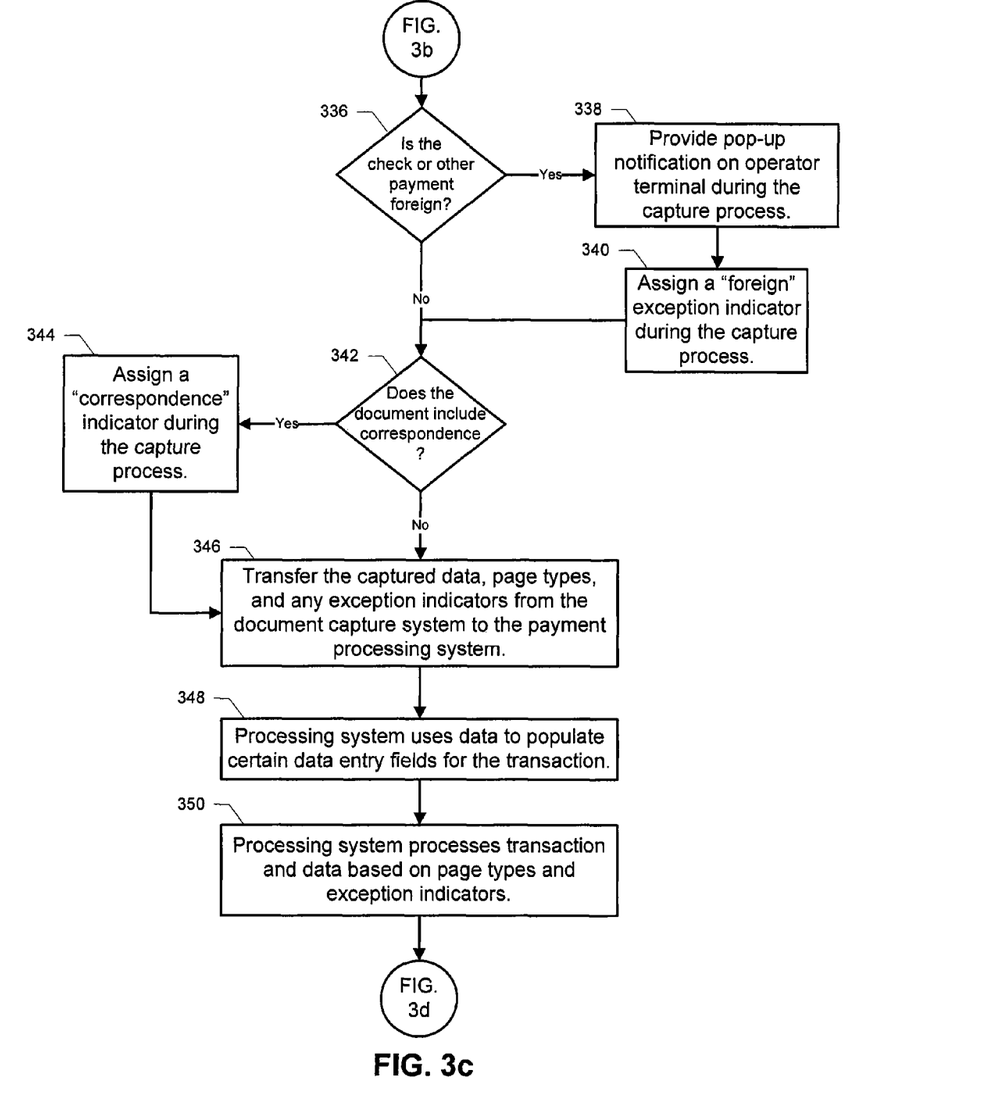

Referring now to FIG. 3c, as represented by block 336, the document capture system 120 determines if the check or other payment is from a foreign bank and/or represents a foreign currency. In one embodiment, the document capture system 120 makes this determination by using character recognition devices and software to recognize different currency identifiers. In other embodiments, the document capture system 120 makes this determination by recognizing from a serial number, barcode, or other identifier, that the check is issued from a foreign payor bank. As represented by block 340, if the document capture system 120 does determine that the form of payment represents a foreign currency, the document capture system 120 assigns a "foreign" exception indicator to the transaction and associates this with the other transaction data. In one embodiment, as represented by block 338, a pop-up notification is displayed on the operator terminal 144 whenever a foreign transaction is discovered during the capture process.

As represented by block 342, the document capture system 120 is also configured to recognize if any correspondence documents exist in the envelope contents and/or if any of the other documents include some form of correspondence on them. For example, a customer submitting a payment may include some form of correspondence that includes special instructions for applying the payment or instructions to change certain account information, such as an address associated with the account. Such correspondence may be in its own letter, or written on a payment stub or coupon. As illustrated by block 344, if the document capture system 120 identifies a correspondence document, the document capture system 120 assigns a "correspondence" exception indicator to the document and/or the transaction associated with the document.

Data captured from the documents, including page types and exception indicators assigned by the document capture system 120, is stored in the memory device 124 and then some or all of this data is transferred to the payment processing system 130 for processing of the payment transaction and any other tasks required by the mailing, as represented by block 346. Additionally, in some embodiments of the invention, the document capture system 120 has the ability to display real-time capture statistics to the operator using the operator terminal 144. For example, the operator terminal 144 may display the number of envelopes, checks, and/or documents processed over a defined period of time. In this way, the operator can identify any problems quickly. In one embodiment, the document capture system 120 retains images and other data, including transaction data, page types, exception indicators, performance metrics, etc., for a predefined period of time, such as a minimum of forty-five days, from capture. In such an embodiment, the document capture system 120 includes an automated process to purge images and other data after the predefined period of time from capture passes.

As represented by block 348, after the data is transferred to the payment processing system 130, the payment processing system 130 uses the data to populate certain data entry fields for the transaction. As represented by block 350, the payment processing system 130 is also configured to recognize the page types and exception indicators assigned to the documents and/or transactions and then processes the transaction data based on these page types and exception indicators.

Figure 3D:
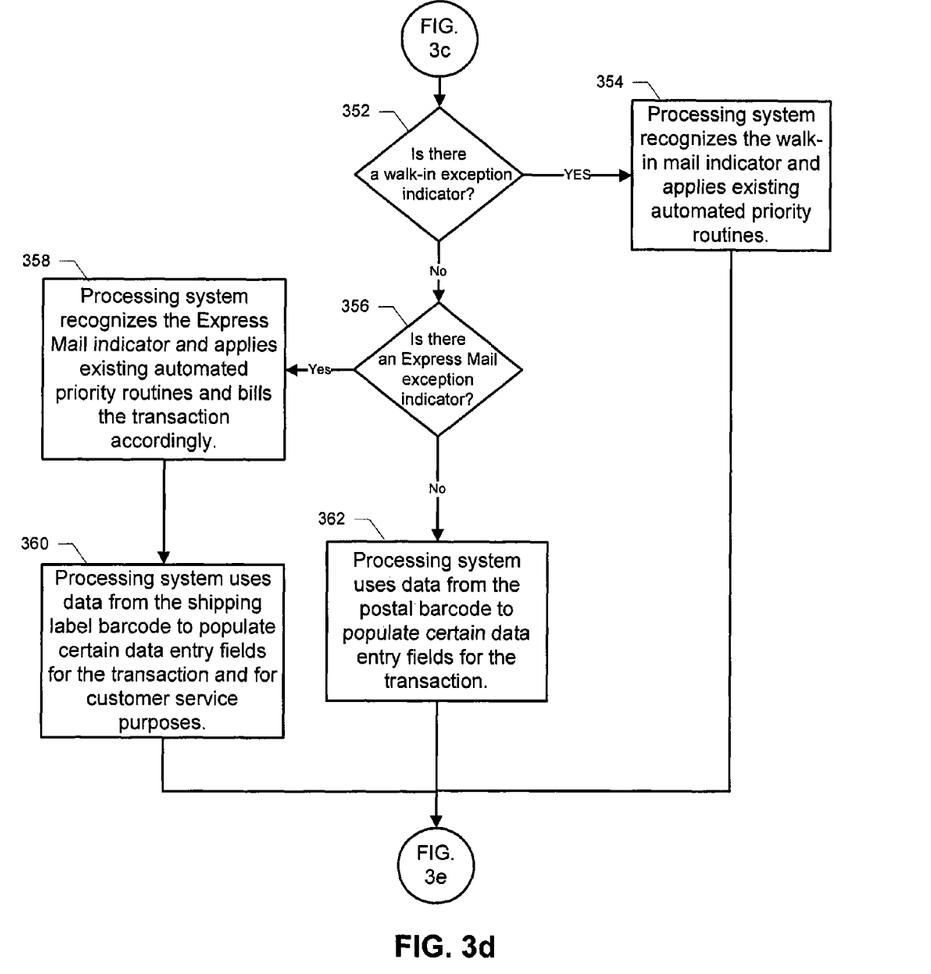

For example, as illustrated in block 352 of FIG. 3d, the payment processing system 130 automatically determines if there is a "walk-in mail" exception indicator associated with the transaction. If the payment processing system 130 recognizes a "walk-in mail" exception indicator, the payment processing system 130 applies existing automated priority routines and bills for the transaction accordingly.

As illustrated by block 356, the payment processing system 130 automatically determines if there is an "Express Mail" exception indicator associated with the transaction. If the payment processing system 130 recognizes an "Express Mail" exception indicator, the payment processing system 130 applies existing automated priority routines and bills for the transaction accordingly. Furthermore, as represented by block 360, the payment processing system 130 uses data from the shipping label, such as data from the label's barcode, to populate certain data entry fields for the transaction and for customer service purposes.

As illustrated by block 362, if the payment processing system 130 does not recognize a "walk-in mail" or "Express Mail" exception indicator associated with the transaction, the processing system 130 retains the regular postal barcode data in the transaction data elements. The payment processing system 130 then makes this data available for customer service purposes, and uses the data to populate certain data entry fields, as defined by a company's data capture instructions and/or as needed to complete the payment transaction.

Figure 3E:
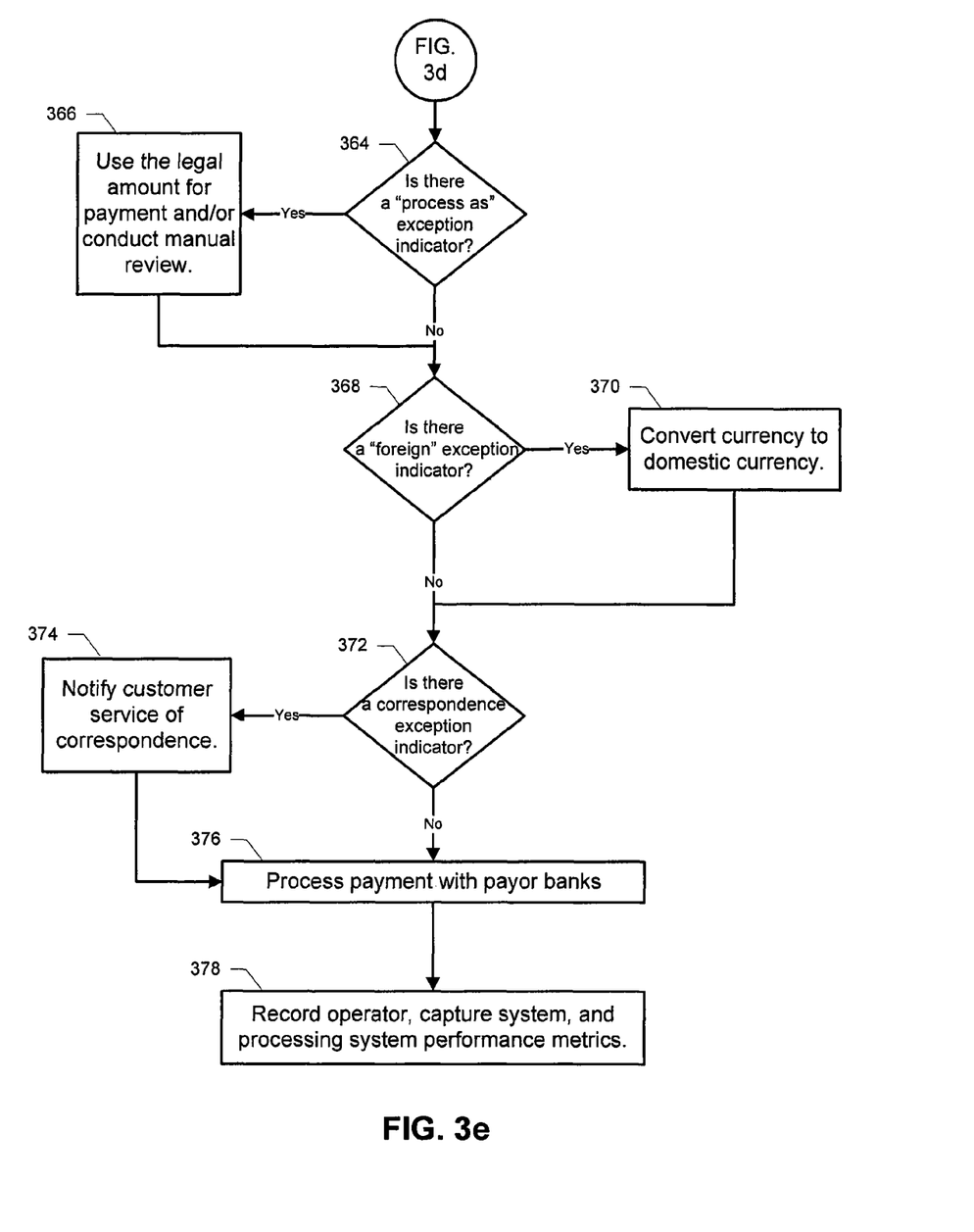

As represented by block 364 in FIG. 3e, the payment processing system 130 automatically determines if there is a "process as" exception indicator associated with the transaction. If the payment processing system 130 recognizes a "process as" exception indicator, as represented by block 366, the payment processing system 130 uses the legal amount for the payment transaction and/or directs the transaction data to an exception process, such as a manual review process, for a decision to be made about whether to go forward with the transaction using the legal amount, or to notify the customer.

As represented by block 368, the payment processing system 130 automatically determines if there is a "foreign" exception indicator associated with the transaction. If the payment processing system 130 recognizes a "foreign" exception indicator, as represented by block 370, the payment processing system 130 converts the currency to domestic currency for use in its records and for updating the customer's account. In one embodiment, the company bills additionally for receiving payments based in foreign currency.

As represented by block 372, the payment processing system 130 automatically determines if there is a "correspondence" exception indicator associated with the transaction and/or with certain data associated with the transaction. If the payment processing system 130 recognizes a "correspondence" exception indicator, as represented by block 366, the payment processing system 130 includes the related volume in the billing data and directs the data into an exception process for handling the correspondence. For example, in one embodiment, the payment processing system 130 notifies customer service of the correspondence.

Ultimately, as represented by block 376, unless the payment is held up in an exception process, the payment processing system 130 communicates with the appropriate payor bank identified in the captured payment data and processes the payment. The payment processing system 130 also communicates with the company's customer account datastore 150 to update the customer's account to reflect the payment.

As represented by block 378, in one embodiment, the document capture system and/or the payment processing system capture, record, and communicate performance metrics, such as operator, capture system, and processing system performance metrics. For example, in one embodiment, the document capture system 120 retains a record of transaction metrics for all batches, including operator ID, start job time, end job time, run time, idle time, jam time, piece count, transaction identifiers (e.g., scannable vs. wholesale), etc. In one embodiment, the document capture system 120 retains metrics by "processing day," as defined by the processing system. The document capture and payment processing systems may also record "non-productive time," where non-productive time is defined as the time between batches while an operator is logged into the document capture system 120.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for processing bill payments received by mail, the system comprising:
   a capture device configured to:
      receive a plurality of payment-related mail items comprising a plurality of envelopes containing one or more items;
      scan the plurality of envelopes and the items to obtain data about each of the plurality of payment-related mail items;
      identify, using a computer processor, one or more exception situations regarding one or more payment-related mail items based on the scanned data;
      automatically store, using a computer processor, one or more exception indicators along with the data obtained about the one or more payment-related mail items in a memory device, wherein the exception indicator provides an indication as to an exception type selected from a plurality of exception types, the one or more exception indicators providing an indication of a foreign payment instrument comprising a payment from a foreign bank or a foreign currency and a situation where the legal amount on a check does not match a courtesy amount on the check, wherein the legal amount comprises an amount written on a line of the check and the courtesy amount comprises a numerical representation of an amount written in a box of the check;
      display the one or more exception indicators and processing instructions associated with the one or more exception indicators on a graphical user interface of an operator terminal that is in communication with the capture device; and
      communicate the data about the plurality of payment-related mail items along with the one or more exception indicators to a payment processing system.

2. The system of claim 1, wherein the exception indicators are in a format that the payment processing system is configured to understand.

3. The system of claim 1, wherein the payment processing system is configured to recognize the one or more exception indicators and process the associated data based on the one or more exception indicators associated with the data.

4. The system of claim 3, wherein the payment processing system is configured to direct the data about the one or more payment-related mail items to one or more exception process paths based on the one or more exception indicators associated with the data.

5. The system of claim 3, wherein the payment processing system is configured to bill a customer a predefined amount based on the one or more exception indicators associated with the data.

6. The system of claim 1,
   wherein the payment processing system is configured to process bill payments based on the data received about one of the plurality of payment-related mail items according to one of a plurality of predefined procedures, wherein the one of the plurality of predefined procedures is selected based on whether the one of the plurality of payment-related mail items is associated with an exception indicator and, if the one of the plurality of payment-related mail items is associated with an exception indicator, the exception type.

7. The system of claim 1, wherein the capture device is configured to identify a particular delivery method that was used to deliver the mail to the system, and wherein at least one exception indicator provides an indication of the particular delivery method.

8. The system of claim 7, wherein the delivery method comprises a walk-in delivery.

9. The system of claim 7, wherein the delivery method comprises an express postal system mail delivery of the plurality of payment-related mail item.

10. The system of claim 1, wherein the capture device is configured to determine that one or more items contain correspondence, and wherein at least one exception indicator provides an indication to the processing system that the one or more items contain correspondence.

11. The system of claim 1, wherein the capture device is further configured to:
    compare the obtained data to predetermined exception situations; and
    determine, using a processing device, one or more indication of exception situations based at least partially on the comparison of the obtained data to one or more predetermined exception situations.

12. The system of claim 1, wherein the payment processing system is configured to:
    determine processing instructions based on the data; and
    automatically group the data based on the processing instructions, wherein the data is grouped into one of a multi-transaction group, a check-only transaction group, and a scannable transaction group.

13. The system of claim 12, wherein the capture device is configured to:
    use one of the scanned envelopes as an end-of-transaction identifier for scannable transactions; and
    substitute the scanned envelope with an electronic end-of-transaction indicator.

14. The system of claim 1, wherein the payment processing system is further configured to:
    store, in a database, transaction metrics for the plurality of payment-related mail items, the transaction metrics comprising an operator identification, start job time, end job time, run time, idle time, jam time, time between batches of the plurality of payment-related mail items while an operator is logged into the system, piece count, scannable transaction identifiers, and wholesale transaction identifiers; and
    track performance metrics of an operator associated with the payment processing system, the capture device, or the payment processing system based on the transaction metrics.

15. The system of claim 14, wherein the performance metrics are tracked for a period of time.

16. A method performed by a first device, the method comprising:
    receiving a payment-related mail item comprising an envelope containing one or more documents;
    capturing data from the envelope or the one or more documents;
    receiving an indication of an exception situation regarding the payment-related mail item associated with the captured data;

storing, using a computer processor, an exception indicator along with the data obtained from the envelope or the one or more documents in a memory device, wherein the exception indicator provides an indication as to an exception type selected from a plurality of exception types, the exception indicator providing an indication of a foreign payment instrument comprising a payment from a foreign bank or a foreign currency and a situation where the legal amount on a check does not match a courtesy amount on the check, wherein the legal amount comprises an amount written on a line of the check and the courtesy amount comprises a numerical representation of an amount written in a box of the check;

displaying, using a computer processor, the exception indicator and processing instructions associated with the exception indicator on a graphical user interface of an operator terminal in communication with the first device; and communicating the data along with the exception indicator to a second device configured to process a payment based on the data and the exception indicator.

17. The method of claim 16, wherein the second device is configured to direct the data to an exception process path based on the exception indicator associated with the data.

18. The method of claim 16, wherein the second device is configured to bill a customer a predefined amount based on the exception indicator associated with the data.

19. The method of claim 16, wherein capturing data from the envelope or the one or more documents comprises:
scanning one or more machine-readable codes associated with the envelope or the one or more documents.

20. The method of claim 16, wherein receiving an indication of an exception situation regarding the payment-related mail item comprises:
automatically identifying the exception situation based on the captured data.

21. The method of claim 16, wherein receiving an indication of an exception situation regarding the payment-related mail item comprises:
receiving input from a user terminal containing an indication of an exception situation.

22. The method of claim 16, wherein the exception situation comprises one of an express postage system mail delivery of the payment-related mail item or a walk-in delivery of the payment-related mail item.

23. The method of claim 16, wherein the capturing data from the envelope or the one or more documents comprises reading an RFID tag associated with the envelopes or the one or more documents.

24. The method of claim 16, further comprising allowing an operator to disassociate the exception indicators from the data.

25. The method of claim 16, wherein the second device is configured to proceed with the legal amount or notify a customer associated with the check of the situation where the legal amount on the check does not match the courtesy amount on the check.

26. The method of claim 16, wherein the second device is configured to:
convert the foreign payment amount to a domestic payment amount;
update an account associated with the exception indicator; and
bill an additional amount for receiving the foreign payment amount.

27. A computer program product comprising a non-transitory computer-readable medium having computer-executable program instructions stored therein, wherein said computer-executable program instructions comprise:
first instructions for identifying a payment-related mail item comprising an envelope containing one or more documents;
second instructions for capturing data from the envelope or the one or more documents;
third instructions for receiving an indication of an exception situation regarding the payment-related mail item associated with the captured data;
fourth instructions for storing an exception indicator along with the data obtained from the envelope or the one or more documents in a memory device, wherein the exception indicator provides an indication as to an exception type selected from a plurality of exception types, the exception indicator providing an indication of a foreign payment instrument comprising a payment from a foreign bank or a foreign currency and a situation where the legal amount on a check does not match a courtesy amount on the check, wherein the legal amount comprises an amount written on a line of the check and the courtesy amount comprises a numerical representation of an amount written in a box of the check;
fifth instructions for displaying the exception indicator and processing instructions associated with the exception indicator on a graphical user interface of an operator terminal; and
sixth instructions for communicating the data along with the exception indicator to a second device configured to process a payment based on the data and the exception indicator.

28. The computer program product of claim 27, wherein the second device is configured to direct the data to an exception process path based on the exception indicator associated with the data.

29. The computer program product of claim 27, wherein the second device is configured to bill a customer a predefined amount based on the exception indicator associated with the data.

30. The computer program product of claim 27, wherein the second instructions for capturing data from the envelope or the one or more documents comprises:
instructions for interpreting one or more machine-readable codes associated with the envelope or the one or more documents.

31. The computer program product of claim 27, wherein the third instructions for receiving an indication of an exception situation regarding the payment-related mail item comprises:
instructions for automatically identifying the exception situation based on the captured data.

32. The computer program product of claim 27, wherein the third instructions for receiving an indication of an exception situation regarding the payment-related mail item comprises:
instructions for receiving input from a user terminal containing an indication of an exception situation.

33. The computer program product of claim 27, wherein the exception situation comprises one of an express postage system mail delivery of the payment-related mail item or a walk-in delivery of the payment-related mail item.

* * * * *